United States Patent [19]
Kishi et al.

[11] Patent Number: 6,074,535
[45] Date of Patent: Jun. 13, 2000

[54] MAGNETORESISTIVE HEAD, METHOD OF FABRICATING THE SAME AND MAGNETIC RECORDING APPARATUS

[75] Inventors: Hitoshi Kishi; Kazuo Kobayashi; Yasuhiro Kitade; Mitsuru Otagiri; Hideyuki Kikuchi, all of Kanagawa, Japan

[73] Assignee: Fujitsu Limited, Kawasaki, Japan

[21] Appl. No.: 08/962,148

[22] Filed: Oct. 31, 1997

Related U.S. Application Data

[63] Continuation of application No. 08/509,464, Jul. 31, 1995, abandoned.

[30] Foreign Application Priority Data

Sep. 9, 1994 [JP] Japan .................................. 6/216187
Apr. 12, 1995 [JP] Japan .................................. 7/086702

[51] Int. Cl.[7] .................................................. C23C 14/34
[52] U.S. Cl. .................................. 204/192.2; 204/192.15; 427/131; 427/132; 427/124; 427/125; 427/250
[58] Field of Search ........................ 204/192.12, 192.15, 204/192.2; 427/124, 125, 131, 132, 250; 360/113

[56] References Cited

U.S. PATENT DOCUMENTS

| | | | |
|---|---|---|---|
| 5,159,513 | 10/1992 | Dieny et al. ............................ | 360/113 |
| 5,206,590 | 4/1993 | Dieny et al. ............................ | 324/252 |
| 5,304,975 | 4/1994 | Saito et al. ............................ | 360/113 |
| 5,447,781 | 9/1995 | Kano et al. ............................ | 360/113 |
| 5,493,465 | 2/1996 | Kamiguchi et al. ................... | 360/113 |

FOREIGN PATENT DOCUMENTS

| | | |
|---|---|---|
| 4280483 | 10/1992 | Japan . |
| 528436 | 2/1993 | Japan . |
| 5242436 | 9/1993 | Japan . |
| 60036 | 3/1994 | Japan . |
| 660333 | 3/1994 | Japan . |
| 690038 | 3/1994 | Japan . |
| 670993 | 4/1952 | United Kingdom ............ 427/132 |

OTHER PUBLICATIONS

Japan 6–60336 Abstract Mar. 1994.

*Primary Examiner*—Rodney McDonald
*Attorney, Agent, or Firm*—Greer, Burns & Crain, Ltd.

[57] ABSTRACT

The present invention relates to a method of fabricating a magnetoresistive head formed by laminating a magnetic layer and a nonmagnetic metal layer including a silver film and used for converting change in magnetic field into change of resistivity of the device. A method of fabricating a magnetoresistive head upon laminating on a substrate a plurality of magnetic layers arranged to put nonmagnetic metal layer therebetween and a bias magnetic layer formed adjacent to one of the magnetic layers to give a magnetization of the specified direction to the magnetic layer, comprising the steps of setting film thicknesses of the nonmagnetic metal layers to be formed, and forming the nonmagnetic metal layers under a condition where temperature of the substrate is held within a temperature range less than an upper limit of a film forming temperature not to cause pin holes in the nonmagnetic metal layer.

9 Claims, 7 Drawing Sheets

MAGNETORESISTIVE HEAD, METHOD OF FABRICATING THE SAME AND MAGNETIC RECORDING APPARATUS

This application is a continuation of application Ser. No. 08/509,464 filed on Jul. 31, 1995, now abandoned.

BACKGROUND OF THE INVENTION

1. Field of the Invention

The present invention relates to a magnetoresistive head, a method of fabricating the same and a magnetic recording apparatus and, more particularly, to a magnetoresistive head formed as a laminated structure of a magnetic layer and a nonmagnetic metal layer including a silver film and used for converting a change in the magnetic field into a change of the resistivity of the device, a method of fabricating the same, and a magnetic recording apparatus employing the magnetoresistive head.

2. Description of the Prior Art

A magnetoresistive head, for example, a spin valve magnetoresistive head, a giant magnetoresistive head or the like, has been used in a magnetic sensor, a magnetic head or the like, and particularly it has been expected to attain miniaturization and large capacity of a magnetic disk device.

FIG. 1A is a sectional view showing a conventional spin valve magnetoresistive head, and FIG. 1B is a perspective view showing the conventional spin valve magnetoresistive head in FIG. 1A.

This magnetoresistive head has been so formed that, on a substrate 11, a backing layer 12, a first magnetic layer 13a, a nonmagnetic metal layer 14, and a second magnetic layer 13b, an antiferromagnetic layer (biasing magnetic layer) 15, and a protection layer 16 are formed in that order, and terminals 17a and 17b are in contact with both ends of the protection layer 16. Basic structure and operation of the spin valve magnetoresistive head have been disclosed in Patent Application Publication (KOKAI) 4-358310.

A spin valve magnetoresistance effect is defined as such phenomenon that an angle between the directions of magnetization of the first and second magnetic layers 13a and 13b is affected by the magnetic field and thus electric resistance of the spin valve film changes based on change in the above angle. By supplying constant current between the terminals 17a and 17b, such change in the electric resistance can be detected as a voltage change between the terminals 17a and 17b.

A magnitude of the spin valve magnetoresistance effect depends upon a film thickness of the nonmagnetic metal layer 14, and it may increase as the nonmagnetic metal layer 14 is formed thin and may decrease as the nonmagnetic metal layer 14 is formed thick. In other words, if the nonmagnetic metal layer 14 is formed thin, electric current passing through the nonmagnetic metal layer 14 is increased. As a result, the same magnetoresistance effect as that derived from the conventional anisotropic magnetoresistance effect is caused. Thus, in order to achieve the spin valve magnetoresistance effect (which is in general larger than the conventional anisotropic magnetoresistance effect), the thin nonmagnetic metal layer 14 is required. It is preferable to form the film thickness of the nonmagnetic metal layer 14 within a range of about 16 to 40 Å.

Conventionally, copper (Cu) may be used as the nonmagnetic metal layer 14. Since Cu has a solid solution relation to Ni, Fe, Co and their alloys used as the magnetic layer, it can diffuse into the magnetic layer by heating. Consequently, there has been a problem in that the spin valve magnetoresistance effect on the substrate becomes small.

On the contrary, when Ag is used as the nonmagnetic metal layer 14, Ag has a non-solid solution relation to Ni, Fe, Co and their alloys used as the magnetic layer. Therefore, it may be considered that such nonmagnetic metal layer 14 has higher heat resistance than that of the conventional spin valve film using Cu as the non-magnetic metal layer 14.

However, when Ag is used as the nonmagnetic metal layer 14 and the film thickness of the Ag film is formed to be thin, the spin valve magnetoresistance effect does not occur. Thus, when the Ag film is used, the film thickness is required to be formed thick to some extent. If the Ag film is so formed, a dilemma, i.e., conflict is caused that ample spin valve magnetoresistance effect cannot be attained again.

SUMMARY OF THE INVENTION

An object of the present invention is to provide a magnetoresistive head having high heat resistance and large magnetoresistance effect, a method of fabricating the same and a magnetic recording apparatus.

According to the magnetoresistive head of the present invention, either the copper-silver alloy film or the laminated films made of the copper film and the copper diffusion preventing film interposed between the copper film and the magnetic layer is used as the nonmagnetic metal layer formed adjacent to the magnetic layer.

In contrast to the case wherein the nonmagnetic metal layer is formed only by the copper film, diffusion of copper hardly occurs in the copper-silver alloy film when being heated. In addition, because of the copper diffusion preventing film interposed between the copper film and the magnetic layer and made of silver film, platinum film, gold film or any alloy film of these metals, for example, copper contained in the copper film is prevented from diffusing into the magnetic layer.

Consequently, even if a heating step is applied during manufacturing of the magnetoresistive head, entering of copper into the magnetic layer can be suppressed, so that degradation in the magnetic characteristic of the magnetic layer can be prevented.

Moreover, the thinner the film thickness of the nonmagnetic metal layer put between the magnetic layers becomes, the more remarkable the spin valve magneto-resistance effect becomes. Therefore, it is desired to make the film thickness of the nonmagnetic metal layer as thin as possible. However, since the nonmagnetic metal layer is apt to condense at high substrate temperature when forming film, it can be considered that the layer is not formed as a continuous film and pin holes are generated therein if the film thickness of the nonmagnetic metal layer is made thin. Because of the pin holes etc., the magnetic combination between the magnetic layers sandwiching the nonmagnetic metal layer is caused and therefore an angle between the directions of magnetization of the magnetic layers therefor always 0°. As a result, the magnetoresistance effect does not occur.

Therefore, the nonmagnetic metal layer must be formed under the film forming condition wherein pin holes are not generated. According to the experiment, it can be found that, if the film thickness of the nonmagnetic metal layer to be formed is set at constant value, an upper limit of the film forming temperature capable of generating no pin holes in the nonmagnetic metal layer and forming a continuous film exists.

According to the method of fabricating a magnetoresistive head of the present invention, a film thickness of said nonmagnetic metal layer to be formed is set, and the nonmagnetic metal layer is formed under a condition where a temperature of said substrate is held within a temperature range less than an upper limit of a film forming temperature not to cause pin holes in the nonmagnetic metal layer.

Thereby, copper can be prevented from being diffused from the nonmagnetic metal layer to the magnetic layer, and the magnetoresistive head having a large magnetoresistance effect can be formed.

In case the silver film is used as the nonmagnetic metal layer or as the copper diffusion preventing film formed adjacent to the copper film in the nonmagnetic metal layer and even if the film thickness of the silver film is made thin, contact between the magnetic layers can be prevented or diffusion of copper into the magnetic layer can be suppressed by keeping the substrate temperature A, when forming the silver film, within the temperature range less than the upper limit of the film forming temperature not to cause pin holes, i.e., $A \approx (t-52.5) \times 2$ where the film thickness of the silver film to be formed is set to t (Å). In particular, in case the substrate temperature A is first determined, it is preferable for the MR ratio to set the film thickness t of the silver film near the lower limit of the film thickness range based on the equation $t \geq A/2 + 52.5$ which can be obtained by rewriting the above equation concerning the film thickness t.

In addition, by setting the film thickness t of the silver film within the range of 8 to 40 Å and thereafter setting the substrate temperature A within the range of −89 to −25° C. based on the equation $A \approx (t-52.5) \times 2$, further ample magnetoresistance effect can be achieved.

DETAILED DESCRIPTION OF THE PREFERRED EMBODIMENTS

There will now be described preferred embodiments of the present invention hereinafter with reference to the accompanying drawings.

Figure 1A:
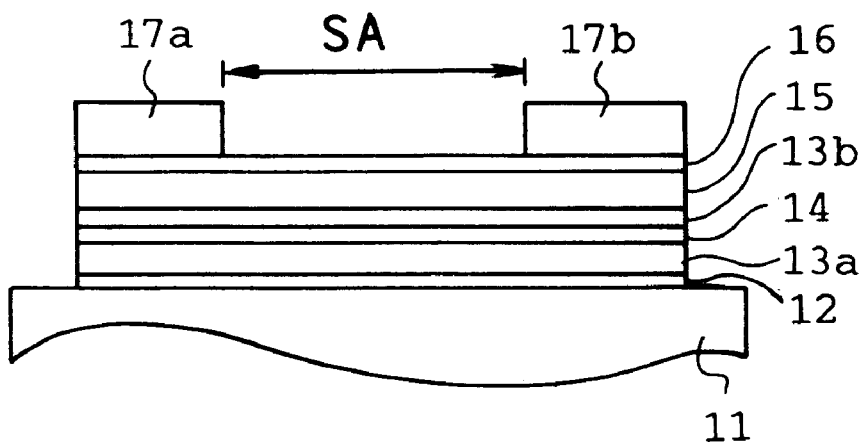
FIG. 1A is a sectional view showing an example of a conventional spin valve magnetoresistive head.
Figure 1B:
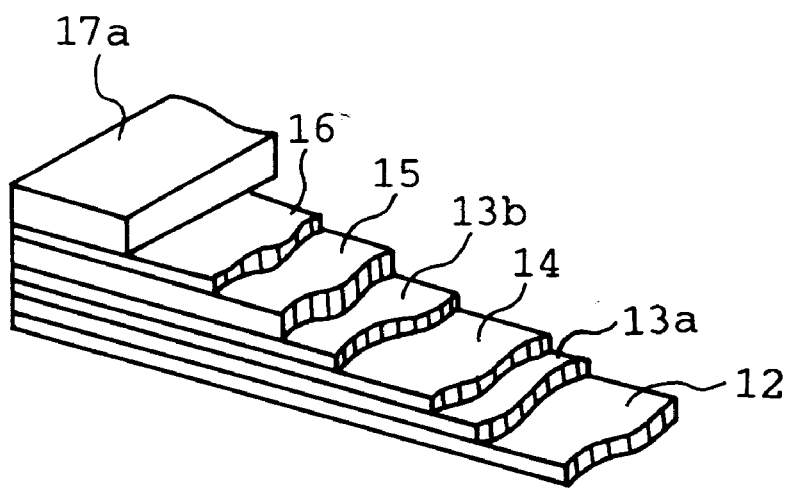
FIG. 1B is a perspective view showing the conventional spin valve magnetoresistive head in FIG. 1A.
Figure 2A:
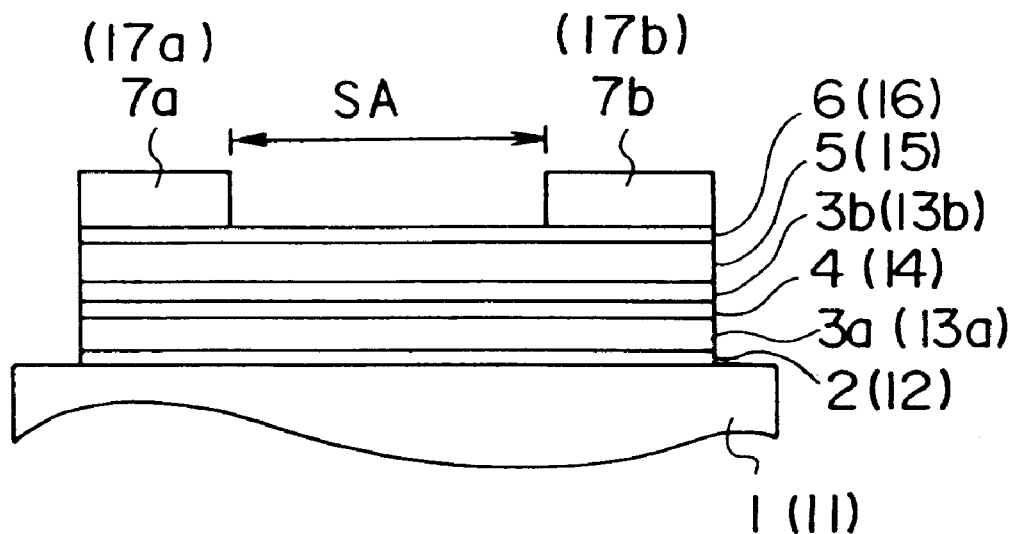
FIG. 2A is a sectional view showing a spin valve magnetoresistive head according to a first embodiment of the present invention.
Figure 2B:
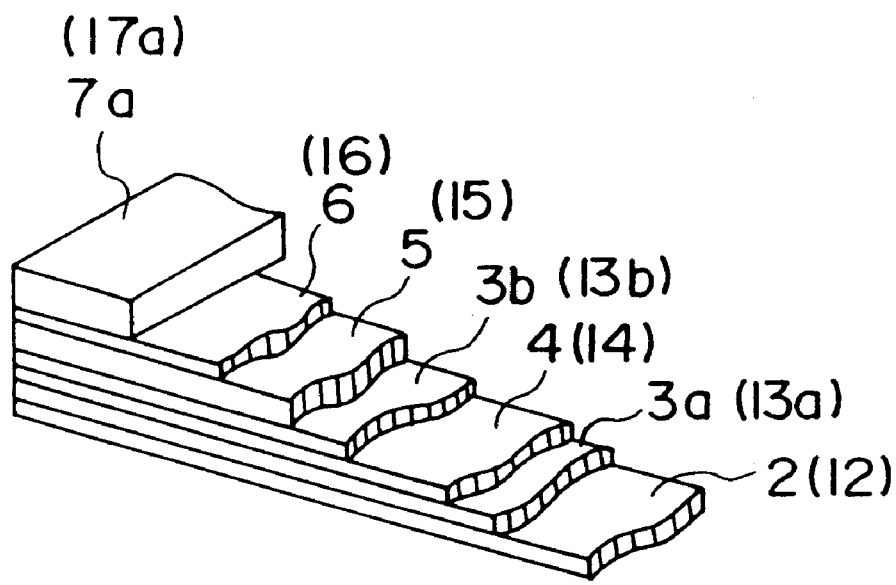
FIG. 2B is a perspective view showing the spin valve magnetoresistive head in FIG. 2A.

(1) Explanation of a spin valve magnetoresistive head according to a first embodiment of the present invention:

FIG. 2A is a sectional view showing a spin valve magnetoresistive head according to a first embodiment of the present invention, and FIG. 2B is a perspective view showing the spin valve magnetoresistive head in FIG. 2A.

In this magnetoresistive head (referred to as MR device hereinafter), a backing layer 2, a first magnetic layer 3a, a nonmagnetic metal layer 4, a second magnetic layer 3b, an antiferromagnetic layer (biasing magnetic layer) 5, and a protection layer 6 are formed in that order on a substrate 1. Terminals 7a and 7b being in contact with both ends of the protection layer 6 are formed so as to put a sense area SA therebetween. The first and second magnetic layers 3a and 3b are formed with ferromagnetic material made of soft magnetic material. For instance, upon forming films by sputtering, the magnetic field of about 30 Oe is applied and magnetization in the mutually orthogonal directions are formed. In addition, respective layers from the backing layer 2 to the protection layer 6 have a rectangular shape of about 3×150 µm.

Besides, in the above example, a first magnetic layer 3a, a nonmagnetic metal layer 4, a second magnetic layer 3b, and an antiferromagnetic layer (biasing magnetic layer) 5 are laminated in that order from the side of the substrate 1, however, they may be laminated in the reverse order.

(Examination of relation between film forming condition and MR ratio)

Figure 4:
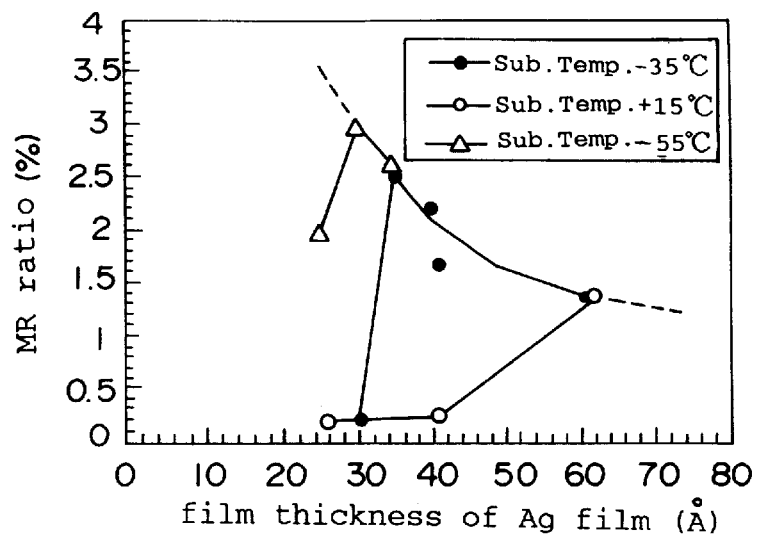
FIG. 4 is a characteristic view showing an examination result of a relation between a film thickness of a silver film and a magnetic resistance ratio in the spin valve magnetoresistive head according to the first embodiment of the present invention.

FIG. 4 is a characteristic view showing an examination result of a relation between a film thickness of a silver (Ag) film and a magnetic resistance (MR) ratio in the spin valve magnetoresistive head according to the first embodiment of the present invention when forming films at substrate temperatures of +15° C., −35° C., −55° C. In FIG. 4, the vertical axis denotes an MR ratio (%) with a linear scale, and the horizontal axis denotes a film thickness of Ag film (Å) with a linear scale. The MR ratio is defined as a ratio of a change amount ΔR of electric resistance to the electric resistance R when the magnetic flux is saturated.

First, the film forming condition will be explained. The MR device has a laminated structure shown in FIGS. 2A and 2B. A backing layer 2 made of tantalum (Ta) film having a thickness of 50 Å, a first magnetic layer 3a made of NiFe film having a film thickness of 90 Å, a nonmagnetic metal layer 4 made of Ag film having a film thickness of t Å, a second magnetic layer 3b made of NiFe film having a film thickness of 40 Å, an antiferromagnetic layer 5 made of FeMn film having a film thickness of 200 Å, and a protection layer 6 made of Ta film having a film thickness of 50 Å are laminated in that order on a silicon substrate 1.

After this, for example, all layers are patterned simultaneously to be formed as a rectangular shape. Then, terminals 7a, 7b made of gold (Au) film are formed on both ends of the protection layer 6 so as to position sense area SA in a central portion therebetween.

Ag films of several therefor film thicknesses t are formed. When forming films, the substrate temperature A is set at three levels, i.e., +15° C., −35° C., and −55° C. with respect to each film thickness.

Under the above various conditions, a maximum MR ratio (referred to simply as MR ratio hereinafter) has been measured.

According to the examination result shown in FIG. 4, in the case of the substrate temperature of +15° C., the MR ratio becomes maximum if the film thickness of the Ag film is about 60 Å. Then if the film thickness of the Ag film becomes thinner than 60 Å, the MR ratio becomes small. This is because the first magnetic layer 3a and the second magnetic layer 3b are in a direct contact with each other because of pin holes generated therein. Otherwise, if the film thickness of the Ag film becomes thicker than 60 Å, the spin valve magnetoresistance effect becomes small because of the film thickness.

In the case of the substrate temperature of −35° C., the MR ratio becomes maximum when the film thickness of the Ag film is about 35 Å. Then if the film thickness of the Ag film becomes thinner than 35 Å, the MR ratio becomes small. This is because the first magnetic layer 3a and the second magnetic layer 3b are directly contacted to each other because of pin holes generated therein. On the contrary, if the film thickness of the Ag film becomes thicker than 35 Å, the spin valve magnetoresistance effect becomes small due to the film thickness.

In the case of the substrate temperature of −55° C., the MR ratio becomes maximum if the film thickness of the Ag film is about 30 Å. Then if the film thickness of the Ag film becomes thinner than 30 Å, the MR ratio becomes small. This is because the first magnetic layer 3a and the second magnetic layer 3b are directly contacted to each other because of pin holes generated therein. Otherwise, if the film thickness of the Ag film becomes thicker than 30 Å, the spin valve magnetoresistance effect becomes small because of the film thickness.

It has been well known conventionally that it is preferable to set the film thickness of the nonmagnetic metal layer between 16 and 40 Å. Referring to FIG. 4, when the film thickness of the Ag film is less than 40 Å, the particularly good MR ratio has been obtained. In addition, in the giant MR device, the film thickness could be reduced by about ½. Therefore, if a lower limit of the film thickness of the Ag film is set to 8 Å and a range of the film thickness is set within 8 to 40 Å and if the substrate temperature is set within a range of −89 to −25° C. on the basis of the above conditional equation, better magnetoresistance effect can be attained.

Figure 5:
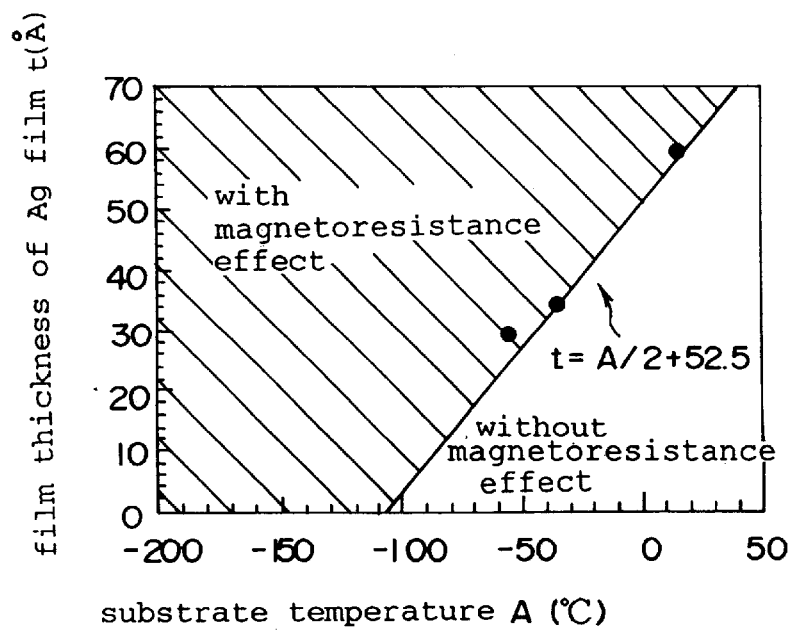
FIG. 5 is a characteristic view showing an examination result of a relation between a film thickness of a silver film, a film forming temperature and a magnetoresistance effect in the spin valve magnetoresistive head according to the first embodiment of the present invention.

FIG. 5 is a characteristic view showing an examination result of a relation between a film thickness of a silver (Ag) film, a film forming temperature and a magnetoresistance effect in the spin valve magnetoresistive head.

First, in FIG. 5, relations between a film thickness t and a substrate temperature A are plotted in case the vertical axis denotes the film thickness t (Å) of the Ag film at the maximum MR ratio and the horizontal axis denotes the substrate temperature A (°C.).

The equation $A \approx (t-52.5) \times 2$ or $t \approx A/2+52.5$ can be derived by a line obtained by connecting these plotted points. This equation indicates an upper limit of the film forming temperature capable of forming the Ag film without pin holes as a continuous film or a lower limit of the film thickness of the Ag film. Therefore, if the film thickness t of the Ag film is first set and the substrate temperature A is then set less than the temperature A derived from the above equation based on such film thickness, remarkable magnetoresistance effect can be attained. On the contrary, if the substrate temperature A is first set and the film thickness t of the Ag film is then set to a thickness derived from the above equation based on such temperature, an Ag film without pin holes can be obtained as a continuous film. Thus, most remarkable magnetoresistance effect can be attained.

In addition, the magnetoresistance effect can be obtained in an area in the left side of this straight line ($t \geq A/2+52.5$). In this area, the film thickness of the Ag film becomes thicker than an optimal film thickness (lower limit of the film thickness). And, in this area, the spin valve magnetoresistance effect is slightly reduced, but relatively large magnetoresistance effect can be attained since its reduction is slight.

On the other hand, in FIG. 5, the magnetoresistance effect cannot be obtained in an area in the lower right side of this straight line ($t < A/2+52.5$). In this area, the film thickness of the Ag film becomes thinner than the optimal film thickness (lower limit of the film thickness). In this area, it can be considered that, because pin holes are generated in the film, the spin valve magnetoresistance effect is not caused abruptly.

(Application example to spin valve MR device)

Figure 3A:
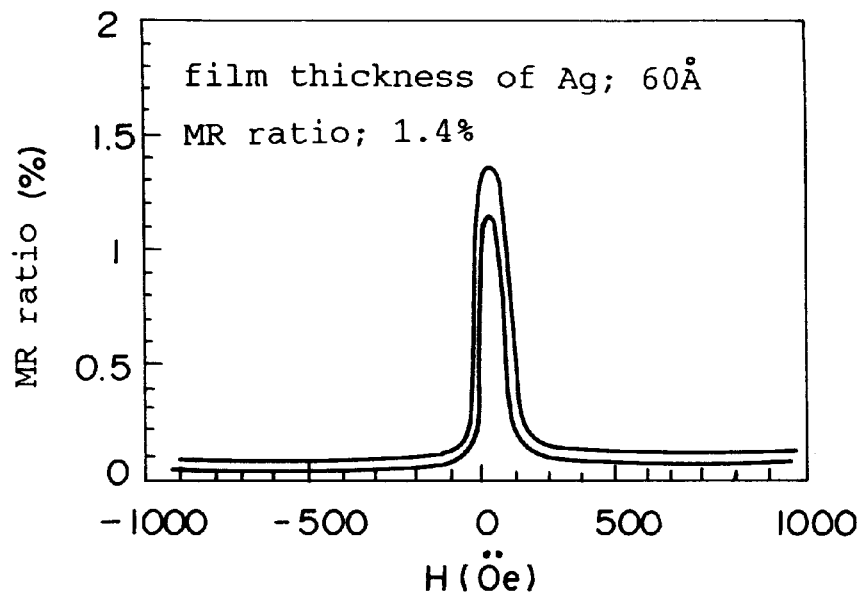
FIG. 3A is a characteristic view showing a relation between a magnitude of magnetic field and a magnetic resistance ratio in the spin valve magnetoresistive head according to a first embodiment of the present invention.
Figure 3B:
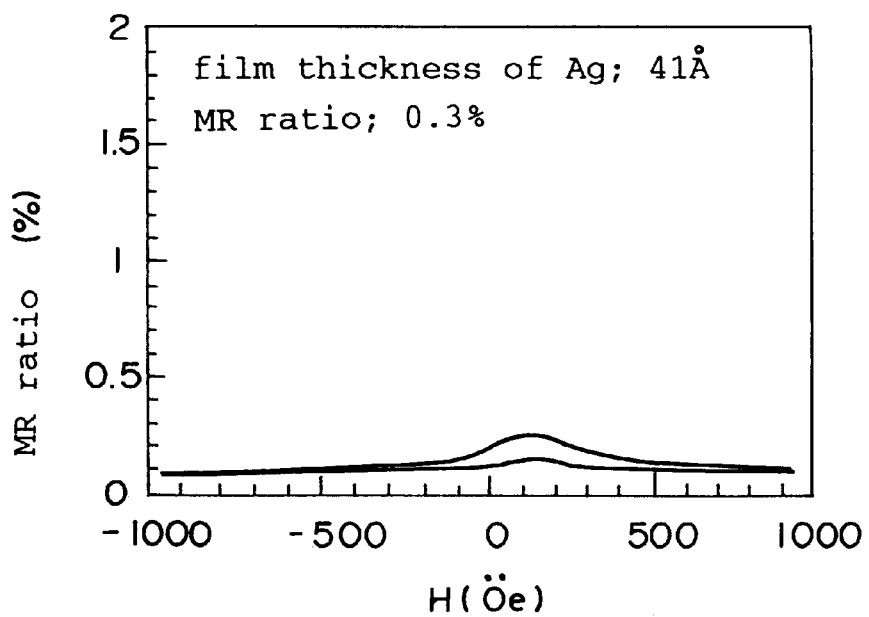
FIG. 3B is a characteristic view showing the same relation as in a spin valve magnetoresistive head as a comparison example.

FIG. 3A is a characteristic view showing a relation between a magnitude of magnetic field (H) and a magnetic resistance (MR) ratio in the spin valve MR device according to the first embodiment of the present invention, and FIG. 3B is a characteristic view showing the same relation as in the spin valve MR device as the comparison example. The vertical axis denotes an MR ratio (%) with a linear scale, and the horizontal axis denotes H (Oe) with a linear scale.

First, the film forming condition of the MR device shown in FIG. 3A will be explained. The MR device has a laminated structure shown in FIGS. 2A and 2B. A backing layer 2 made of Ta film having a thickness of 50 Å, a first magnetic layer 3a made of NiFe film having a film thickness of 90 Å, a nonmagnetic metal layer 4 made of Ag film having a film thickness of 60 Å, a second magnetic layer 3b made of NiFe film having a film thickness of 40 Å, an antiferromagnetic layer 5 made of FeMn film having a film thickness of 200 Å, and a protection layer 6 made of Ta film having a film thickness of 50 Å are laminated in that order on a silicon substrate 1. While keeping the temperature A (°C.) of the substrate at +15° C., the Ag film has been formed. The temperature of the substrate corresponds to $A=(t-52.2) \times 2$ when the film thickness of the Ag film to be formed is set to t Å.

On the contrary, the film forming conditions of the MR device shown in FIG. 3B differ from that of the first experimental example in that the film thickness of the nonmagnetic metal layer 4 is changed to 41 Å. Other conditions are identical to that of the first experimental example. In this case, the temperature is within a range of $A < (t-52.5) \times 2$.

According to FIG. 3A, this MR device has the maximum MR ratio of 1.4%, and exhibits relatively remarkable magnetoresistance effect. The relation of the magnitude H of the magnetic field and the MR ratio has a slight hysteresis characteristic.

On the other hand, according to FIG. 3B, this MR device has the maximum MR ratio of 0.3%, and scarcely exhibits magnetoresistance effect. In other words, the film thickness t of the Ag film becomes thin with respect to the set temperature A of the substrate. In case the film thickness t of the Ag film is set at 41 Å in order to satisfy the condition of A<(t−52.5)×2, the temperature A of the substrate must be lowered to be set less than −23° C.

(Application example to artificial lattice type MR device)

Figure 6:
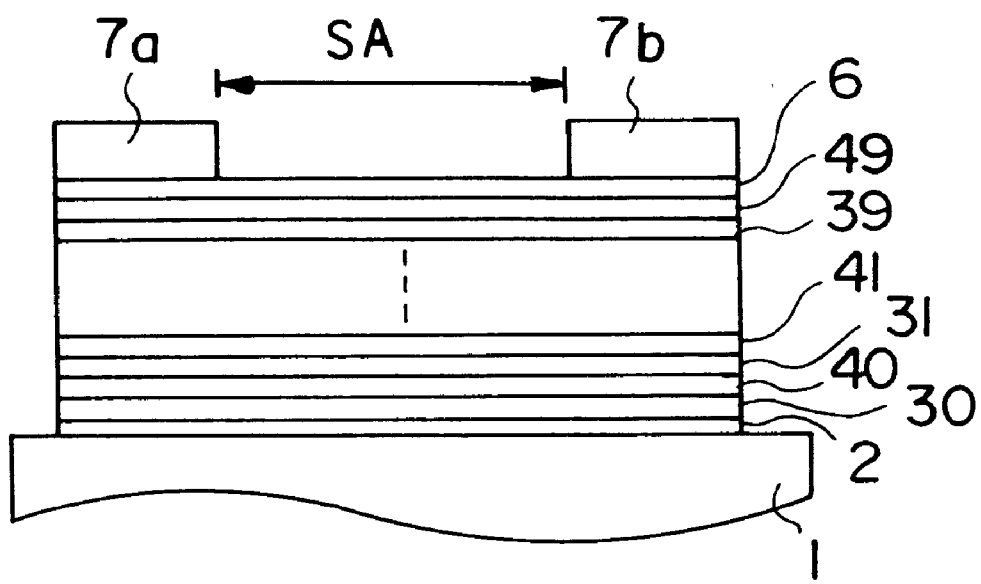
FIG. 6 is a sectional view showing an artificial lattice type magnetoresistive head according to the first embodiment of the present invention.

In addition, the present invention is not limited to the above spin valve MR device, but may be applied to an artificial lattice type MR device. FIG. 6 is a sectional view showing an artificial lattice type MR device according to the first embodiment of the present invention.

The artificial lattice type magnetoresistive head is so formed that a backing layer 2, a first magnetic layer 30, a first nonmagnetic metal layer 40, a second magnetic layer 31, a second nonmagnetic metal layer 41, a plurality of sets of magnetic layers and nonmagnetic metal layers, a N-th magnetic layer 39, a N-th nonmagnetic metal layer 49, and a protection layer 6 are formed in that order on a substrate 1. Terminals 17a and 17b contacted to both ends of the protection layer 6 are formed so as to put a sense area SA therebetween. Moreover, a plurality of sets of magnetic layers and nonmagnetic layers between a second nonmagnetic metal layer 41 and the N-th magnetic layer 39 are formed by laminating about 10 to 20 sets of layers, for example.

In the above device, the substrate 1 is made of Si substrate, the backing layer 2 is made of Ta film having a film thickness of 50 Å, each of the first to the N-th magnetic layers 31, 32, 39 is made of NiFe film having a film thickness of 20 Å, each of the first to the N-th nonmagnetic metal layers 40, 41, 49 is made of Ag film having a film thickness of 20 Å, and the protection layer 6 is made of Ta film having a film thickness of 50 Å.

Since, like the spin valve MR device, this artificial lattice type MR device is formed by laminating the magnetic layer and the nonmagnetic layer formed of the Ag film, the same effect as that obtained by the spin valve MR device can be attained by setting the film thickness of the Ag film and the temperature of the substrate corresponding to such film thickness, as described above.

Figure 7:
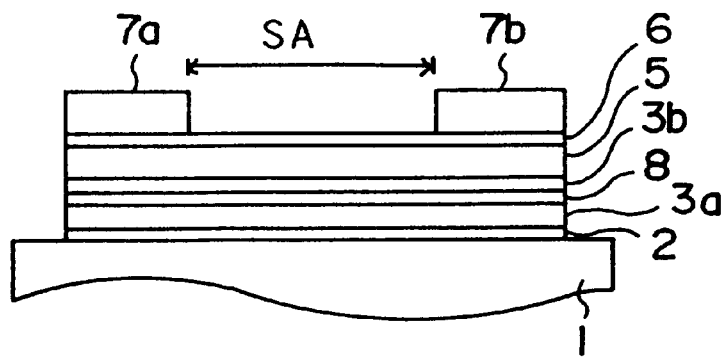
FIG. 7 is a sectional view showing a spin valve magnetoresistive head according to a second embodiment of the present invention.

(2) Explanation of spin valve MR device according to a second embodiment of the present invention:

FIG. 7 is a sectional view showing a spin valve magnetoresistive head according to a second embodiment of the present invention. This MR device has a laminated layer structure shown in FIGS. 2A and 2B, and utilizes a silver-copper alloy film (AgCu alloy film) instead of the Ag film as the nonmagnetic metal layer 8.

The film forming condition of the above MR device will be explained hereinafter.

On a silicon substrate 1 having a (100) face, a backing layer 2 made of Ta film having a thickness of 50 Å, a first magnetic layer 3a made of NiFe film having a film thickness of 90 Å, a nonmagnetic metal layer 8 made of AgCu alloy film having Ag at the rate of 75%, a second magnetic layer 3b made of NiFe film having a film thickness of 40 Å, an antiferromagnetic layer (biasing magnetic layer) 5 made of FeMn film having a film thickness of 200 Å, and a protection layer 6 made of Ta film having a film thickness of 50 Å are laminated in that order. Terminals 7a, 7b are formed at both ends of the protection layer 6.

The AgCu alloy film as the nonmagnetic metal layer 8 has a film thickness of 40 Å, and is formed by sputtering in a state where the temperature of the substrate is set and held at a temperature of −65° C. according to the above conditional equation, which is less than an upper limit of the temperature range for the 40 Å thickness.

Even if heat treatment has been effected with respect to this MR device for one hour and at 230° C., reduction of the MR ratio cannot be detected. On the other hand, in the conventional case where the copper (Cu) film is used as the nonmagnetic metal layer, if heat treatment has been effected with respect to this MR device for one hour and at 230° C., the MR ratio is reduced by 25%.

Based on the spin valve MR device according to the above second embodiment, the AgCu alloy film is used as the nonmagnetic metal layer 8, the film thickness of the AgCu alloy film to be formed is set. Thereafter, the AgCu alloy film is formed in a state where the temperature of the substrate is held within a temperature range less than an upper limit of the film forming temperature so as not to cause pin holes in the AgCu film. Therefore, continuous thin films with no pin holes can be formed.

Thereby, diffusion of Cu in the AgCu alloy film can be suppressed to thus improve the heat resistance characteristic. In addition, large magnetoresistance effect can be attained by forming thin and continuous AgCu alloy film without pin holes.

Figure 8:
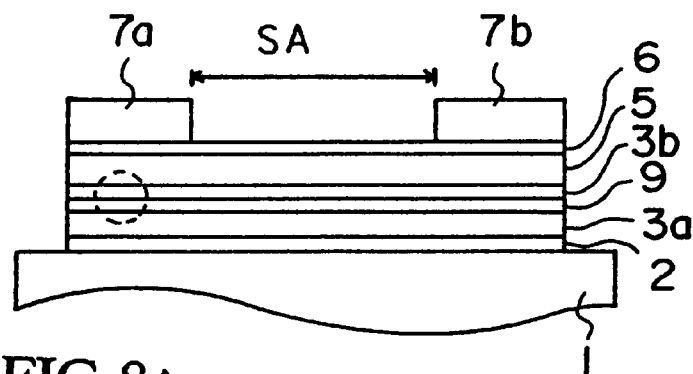
FIG. 8 is a sectional view showing a spin valve magnetoresistive head according to a third embodiment of the present invention.
Figure 8A:
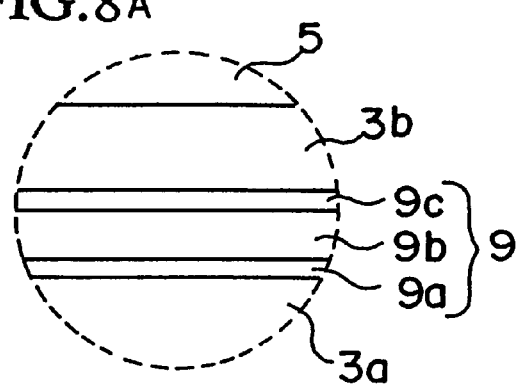
FIG. 8A is an enlarged view of the section enclosed by the dashed line in FIG. 8.

(3) Explanation of spin valve MR device according to a third embodiment of the present invention:

FIG. 8 is a sectional view showing a spin valve magnetoresistive head according to a third embodiment of the present invention. FIG. 8A is an enlarged view of the section enclosed by the dashed line in FIG. 8. This MR device has a laminated layer structure shown in FIGS. 2A and 2B, and utilizes a three layered nonmagnetic metal film, i.e., nonmagnetic metal film formed of Ag film 9a/Cu film 9b/Ag film 9c instead of the Ag film as the nonmagnetic metal layer 9.

The film forming condition of the above MR device will be explained hereinafter.

On a silicon substrate 1 having a (100) face, a backing layer 2 made of Ta film having a thickness of 50 Å, a first magnetic layer 3a made of NiFe film including Ni and Fe at the rate of 82 and 18 and having a film thickness of 90 Å, a nonmagnetic metal layer 9, a second magnetic layer 3b made of NiFe film having a film thickness of 40 Å, an antiferromagnetic layer (biasing magnetic layer) 5 made of FeMn film having a film thickness of 120 Å, and a protection layer 6 made of Ta film having a film thickness of so A are laminated in that order. Terminals 7a, 7b are formed at both ends of the protection layer 6.

The nonmagnetic metal layer 9 comprises upper and lower Ag films 9a, 9b to put the Cu film 9b therebetween, each having a thickness of 2 Å, and the central Cu film 9b having a thickness of 16 Å. The thinner the Ag film becomes, the smaller the shunt effect becomes and the higher the MR ratio becomes. Therefore, the Ag film is formed extremely thin.

When forming the nonmagnetic metal layer 9, respective layers of Ag film 9a/Cu film 9b/Ag film 9c are formed by sputtering in a state where the temperature of the substrate is kept at −100° C. according to the above conditional equation. The temperature of the substrate has been held at a normal temperature of 25° C. during forming other layers except for the nonmagnetic metal layer 9.

It has been confirmed that the MR ratio is not changed even when heat treatment of 300° C. is performed with respect to this MR device. In contrast to the conventional case where the copper (Cu) film is used as the nonmagnetic metal layer and the temperature is limited up to 230° C., the heat resistance can be extremely improved.

According to the spin valve MR device by the above third embodiment, even if the film thickness thereof is set to be 2 Å, it is possible to form the Ag films 9a, 9c with flat surfaces and no pin holes by keeping the temperature of the substrate 1 at a low temperature less than −100° C. during forming films.

Accordingly, available magnetoresistance effect can be obtained by forming thin Ag films 9a, 9b, and the Cu contained in the Cu film 9b can be prevented from diffusing into the upper and lower magnetic layers 3a and 3b by sandwiching the Cu film 9b by the Ag films 9a, 9c with no pin holes. As a result, the heat resistance can be increased.

Note that although, in the above third embodiment, Ag films 9a, 9c are used as the copper diffusion preventing film for sandwiching the Cu film 9b, a platinum (Pt) film, a gold (Au) film or an alloy film including any one of these metals may be used.

Figure 9A:
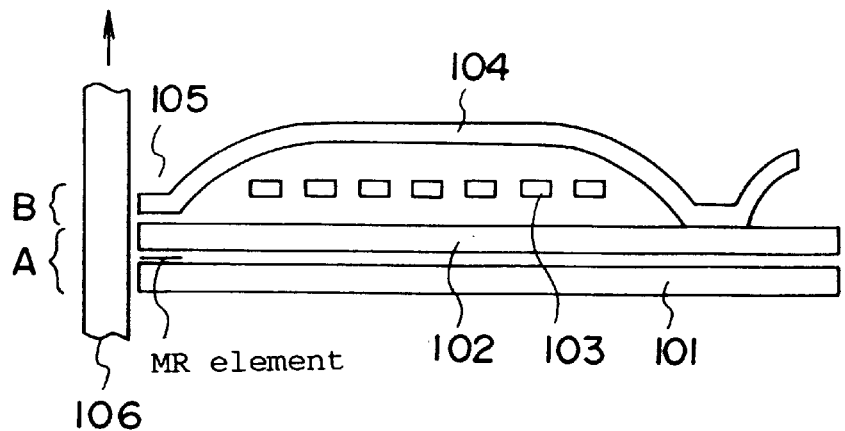
FIG. 9A is a side view showing a composite MR head having therein the spin valve magnetoresistive head according to the embodiment of the present invention.
Figure 9B:
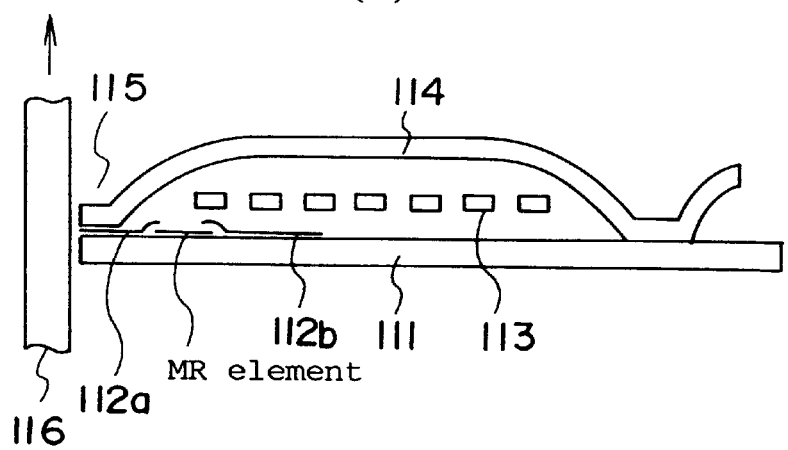
FIG. 9B is a side view showing an in-gap type MR head having therein the spin valve magnetoresistive head according to the embodiment of the present invention.
Figure 9C:
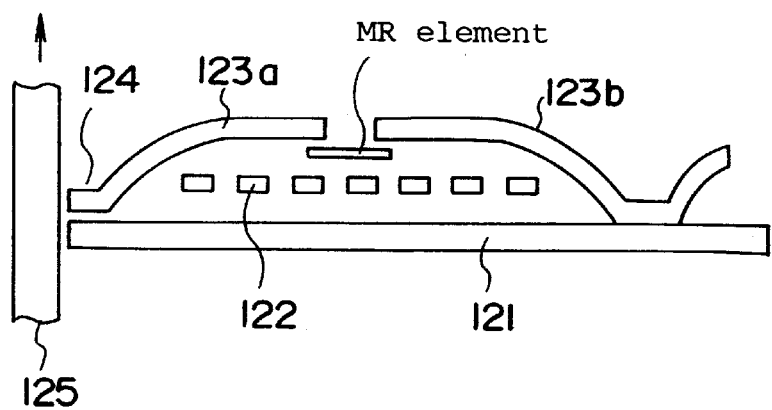
FIG. 9C is a side view showing a yoke type MR head having therein the spin valve magnetoresistive head according to the embodiment of the present invention.

(4) Explanation of magnetic recording apparatus according to a fourth embodiment of the present invention:

Next, with reference to FIGS. 9A to 9C, a magnetic recording apparatus according to the fourth embodiment of the present invention into which the MR head described above is incorporated will be explained. FIGS. 9A to 9C are sectional views each showing a magnetic head portion of the magnetic recording apparatus and a magnetic recording medium.

FIG. 9A shows a composite type MR head. An A portion denotes a reproducing head, and a B portion denotes a recording head. A soft magnetic layer 102 is commonly used as a magnetic shield of the reproducing head and a magnetic pole of the recording head.

As shown in FIG. 9A, in the reproducing head portion, soft magnetic layers 101, 102 used as the magnetic shield are positioned to oppose each other at a distance. The MR element described above is put into a gap of a portion 105 facing to a magnetic recording medium 106. A leakage magnetic field generated from the magnetic recording medium 106 can be directly detected.

In the reproducing head portion, soft magnetic layers 102, 104 used as the magnetic poles are positioned to oppose each other at a distance. A coil 103 which generates magnetic flux flowing through the soft magnetic layers 102, 104 is formed in a gap of the soft magnetic layers 102, 104. By generating the leakage magnetic field from the gap of the facing portion 105 by this magnetic flux, the magnetic recording medium 106 can record various information.

According to this magnetic recording apparatus, since either one of the MR heads according to the first to third embodiments is employed in the reproducing portion, the magnetic recording apparatus having excellent heat resistance and high reproducing sensitivity has been provided.

FIG. 9B shows an in-gap type MR head with flux guides. As shown in FIG. 9B, soft magnetic layers 111, 114 used as the magnetic poles are positioned to oppose each other at a distance. The MR element described above is put into a gap of a portion 115 facing to a magnetic recording medium 116. A coil 113 which generates magnetic flux passing through the soft magnetic layers 111, 114 is formed in a gap of the soft magnetic layers 111, 114.

In order to avoid corrosion or direct contact to the magnetic recording medium, the MR element is positioned inside of the magnetic head, without being protruded to the portion 115 facing to the magnetic recording medium 116. A flux guide 112a which is electrically isolated from the MR element and magnetically coupled thereto is protruded to the facing portion 115. The leakage magnetic field generated by the magnetic recording medium 116 is entered into the flux guide 112a and then detected by the MR element. At the other end of the MR element, another flux guide 112b which is electrically isolated from the MR element and magnetically coupled thereto is formed to guide the magnetic flux from the MR element to the soft magnetic layers 111, 114.

According to this magnetic recording apparatus, since either one of the MR heads according to the first to third embodiments is employed in the reproducing portion, the magnetic recording apparatus having excellent heat resistance and high reproducing sensitivity has been provided.

FIG. 9C shows a yoke type MR head. As shown in FIG. 9C, soft magnetic layers 121, 123a and 123b used as the magnetic poles are positioned to oppose to each other at a distance. A coil 122 which generates magnetic flux passing through the soft magnetic layers 121, 123a and 123b is formed in a gap of the soft magnetic layers 121, 123a and 123b. The MR element is positioned at ends of the soft magnetic layers 123a and 123b such that it is electrically isolated from the soft magnetic layers 123a and 123b and magnetically coupled thereto. The leakage magnetic field is generated from the gap of the facing portion 124 by the magnetic flux which is generated by the coil 122 and passes through the soft magnetic layers 121, 123a and 123b, so that the magnetic recording medium 125 can record various information.

Also, in this case, according to this magnetic recording apparatus, since either one of the MR elements according to the first to third embodiments is employed in the reproducing portion, the magnetic recording apparatus having excellent heat resistance and high reproducing sensitivity has been provided.

In the magnetic recording apparatus shown in FIGS. 9A to 9C, a substrate on which the magnetic head is formed and insulating films between the soft magnetic layers etc. are omitted.

Note that the MR element according to the present invention may be used in various magnetic recording apparatus as well as the above magnetic recording apparatus equipped with the recording portion and the reproducing portion.

Moreover, the MR element may be used in a reproducing-only magnetic recording apparatus.

As has been described above, according to the above MR head of the embodiments of the present invention, since the silver film, the silver-copper alloy film or the laminated film made of the copper film and the copper diffusion preventing film is used as the nonmagnetic metal layer, the MR head having excellent heat resistance has been provided.

In addition, since the nonmagnetic metal layer is formed under the condition wherein the substrate temperature is kept within the temperature range less than the upper limit of the film forming temperature not to generate the pin holes in the nonmagnetic metal layer, the MR head having excellent heat resistance and large magnetoresistance effect has been provided.

What is claimed is:

1. A method of fabricating a magnetoresistive head in which at least a magnetic layer and a nonmagnetic metal layer adjacent to said magnetic layer are laminated on a substrate, comprising the steps of:

selecting as said nonmagnetic metal layer a silver film or an alloy film including silver;

setting a film thickness t (Å) of said silver film or said alloy film including silver to be formed and setting a temperature A (°C.) of said substrate within a range of $A \leq (t-52.2) \times 2$, wherein $A < 0°$ C.

when said silver film or said alloy film including silver is to be formed; and forming said silver film or said alloy film including silver to have a film thickness t (Å) under a condition where a temperature of said substrate is held at said temperature A (°C.) so as not to cause pin holes in said nonmagnetic metal layer.

2. A method of fabricating a magnetoresistive head according to claim 1, wherein defining as a set a laminated combination of the magnetic layer and the nonmagnetic metal layer, a plurality of the sets are laminated so as to alternate the magnetic layer and the nonmagnetic metal layer.

3. A method of fabricating a magnetoresistive head according to claim 1, wherein a first magnetic layer, said nonmagnetic metal layer, a second magnetic layer and a biasing magnetic layer to give a magnetization of a specified direction to said second magnetic layer are laminated in that order.

4. A method of fabricating a magnetoresistive head according to claim 1, wherein said film thickness t(Å) of said silver film is within a range of $$8 \leq t \leq 40.$$

5. A method of fabricating a magnetoresistive head according to claim 1, wherein the nonmagnetic layer is a copper-silver alloy film.

6. A method of fabricating a magnetoresistive head according to claim 1, wherein said temperature A (°C.) of said substrate is set to be within a range of between approximately −89° C. and approximately −25° C.

7. A method of fabricating a magnetoresistive head in which at least a magnetic layer and a nonmagnetic metal layer adjacent to said magnetic layer are laminated on a substrate, comprising the steps of:

selecting a copper diffusion preventing film adjacent to said magnetic layer and a copper film as said nonmagnetic metal layer;

setting a film thickness t (Å) of said copper diffusion preventing film to be formed and setting a temperature A (°C.) of said substrate within a range of $A \leq (t-52.2) \times 2$, wherein $A < 0°$ C.

when said copper diffusion preventing film is to be formed; and forming said copper diffusion preventing film under a condition where a temperature of said substrate is held at said temperature A (°C.) so as not to cause pin holes in said copper diffusion preventing film.

8. A method of fabricating a magnetoresistive head according to claim 7, wherein said copper diffusion preventing film is a silver film or an alloy film including silver.

9. A method of fabricating a magnetoresistive head according to claim 7, wherein said temperature A (°C.) of said substrate is set to be within a range of between approximately −89° C. and approximately −25° C.

* * * * *